United States Patent

[11] 3,539,009

[72] Inventor Walter J. Kudlaty
Elmhurst, Illinois
[21] Appl. No. 716,062
[22] Filed March 26, 1968
[45] Patented Nov. 10, 1970
[73] Assignee Marvel Engineering Company
Chicago, Illinois
a corporation of Delaware

[54] RESERVOIR-FILTER ASSEMBLY
7 Claims, 6 Drawing Figs.

[52] U.S. Cl. ................................................ 210/90,
210/132, 210/232, 210/257, 210/436
[51] Int. Cl. .................................................. B01d 35/14
[50] Field of Search .......................................... 210/454,
249, 167, 172, 257, 258, 232, 130, 90, 132, 406,
416, 472, 436, 238

[56] References Cited
UNITED STATES PATENTS
715,554 12/1902 Craine .................... 210/406X

| 1,671,607 | 5/1928 | Pierce | 210/454 |
| 3,342,332 | 9/1967 | Kudlaty | 210/130X |
| 3,384,242 | 5/1968 | Kudlaty | 210/436 |
| 3,440,802 | 4/1969 | Rosaen | 210/238 |

FOREIGN PATENTS
97,417 6/1898 Germany .................... 210/416

Primary Examiner—Reuben Friedman
Assistant Examiner—Frank A. Spear, Jr.
Attorney—Parker, Carter and Markey ABSTRACT: A reservoir-filter assembly wherein a filter element is within the lower portion of a separate filter housing of a height greater than the maximum liquid level within the reservoir, the housing and reservoir communicating adjacent their lower ends, and means drawing liquid from the housing through the element. The cover for the housing carries a bypass valve, element insertion-removal means, and a contamination indicator. Deaeration means insure a head of fluid above the filter element.

Patented Nov. 10, 1970

INVENTOR.
Walter J. Kudlaty
BY Parker & Carter
Attorneys.

INVENTOR.
Walter J. Kudlaty
BY Parker & Carter
Attorneys.

RESERVOIR-FILTER ASSEMBLY

A reservoir and a separate filter housing communicate adjacent their lower ends to deliver liquid into the filter housing, the connecting means between the filter housing and reservoir serving as a housing base and as a manifold for transmission of fluid to be filtered from the reservoir to the filter housing and for transmission of filtered fluid from the filter housing, said manifold including a sleeve supporting a filter element and an outlet passage through said sleeve and manifold. An indicator-bypass valve assembly and means for positioning and removing the filtered element, along with a filter for the bypassing fluid and deaeration means are provided, the latter insuring an adequate supply or head of fluid for filtering by the filter element, the deaeration structure being free of human error in removing the filter element for cleaning, the manifold precluding turbulence with the pump running and the filter element removed.

This invention relates to filter structures and has particular relation to a filter-reservoir assembly.

One purpose of the invention is to provide a filter-reservoir assembly incorporating a filter housing of minimum weight and cost.

Another purpose is to provide a filter-reservoir assembly employing a standard type filter element.

Another purpose is to provide a filter-reservoir assembly including a filter housing base serving as a mounting means for a filter housing and filter element and as a manifold providing for transfer of fluid from the reservoir to the housing and for delivery of filtered fluid outwardly of the housing.

Another purpose is to provide a filter housing cover assembly including indicator means, a bypass valve and connection elements serving to insert and remove a filter element into and from an elongated housing.

Another purpose is to provide a filter-reservoir assembly which shall insure a supply of fluid to the filter element whenever the system pump is operating and which shall avoid air entrapment in the fluid, cavitation of the fluid pump and the need for priming the system.

Another purpose is to provide a filter-reservoir assembly enabling removal, cleaning and reinsertion of a filter element while the system pump is operating and without draining of filter housing or reservoir.

Another purpose is to provide a filter-reservoir system capable of continuously supplying fluid to a suction pump without changeover valves or piping.

Another purpose is to provide a filter-reservoir assembly permissive of filter element removal-insertion without tools and with minimum expenditure of time and effort.

Another purpose is to provide a filter-reservoir assembly of maximum simplicity and economy in manufacture and use.

Other purposes will appear from time to time during the course of the specification and claims.

The invention is illustrated more or less diagrammatically in the accompanying drawings wherein:

FIG. 3 is a detail view of an accessory portion of the invention;

FIG. 4 is a top view of the structure of FIG. 3;

FIG. 5 is a detail view of an accessory structure usable with a variant form of filter element; and FIG. 6 is a detail view of a variant form of diffuser means.

Like parts are indicated by like numerals throughout the specification and drawings.

Figure 1:
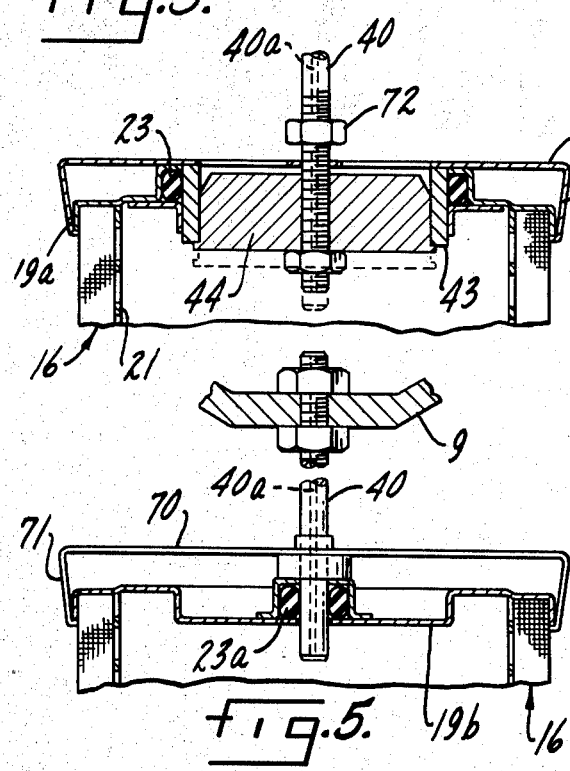
FIG. 1 is a diagrammatic side view with parts in section.

Referring now to the drawings, the numeral 1 generally indicates a reservoir, tank or container for a supply of fluid 2. The fluid 2 may vary in nature without departing from the nature and scope of the invention. An example, however, would be hydraulic fluid utilized in the operation of hydraulic rams employed with machinery of various types.

A cover 3 closes the upper open end of reservoir 1. An aperture or opening 4 is formed in the side wall of reservoir 1 adjacent its bottom wall. Secured to the outer wall of reservoir 1 in alignment with the opening 4 is a combined filter housing base and fluid manifold member 5. The member 5 has a bottom drain 5a and may be secured to the reservoir 1 by suitable fasteners, such as those indicated at 6.

Upstanding on member 5, and with a seal 5b, secured thereto by suitable means, such as the tie rods 7, is an elongated cylinder 8a of cylindrical filter housing 8 formed of relatively thin material. A closure 9 seats upon a simple ring seal 9a on the upper open end of housing 8. The closure 9 may be secured to the upper end of housing 8 by any suitable means, such as the wing nuts 10 turned upon the upper threaded ends of rods 7. A bracket 8b is secured to housing 8 and engages fastener 8c on reservoir 1. The tie rods 7 are threaded through lugs 7a secured, as by welding for example, to the external upper surface of housing 8. If desired, cylinder 8a could be secured to base 5 and cover 9 to cylinder 8a by individual bolts or fasteners in place of tie rods 7 without departing from the nature and scope of the invention. The housing generally defined by cylinder 8a must be of a height greater than the maximum level of the fluid in reservoir tank 1.

The hollow, central sleeve 15 rises from member 5 in substantial axial alignment with housing 8 for slidable engagement with a filter element generally indicated by the numeral 16. While the filter element 16 may take a variety of forms, it will be understood that fluid to be filtered flows from the area within housing 8 through the filter media of element 16 and into the outlet passage 17 defined by sleeve 15. The element 16 includes a pair of end caps 18, 19. Cap 18 has a central, outward extension 18a carrying ring seal 20 for engagement with the outer surface of sleeve 15. A cylindrical core formed of perforated metal extends between caps 18, 19 and is indicated at 21.

Cap 19 has an axially, outwardly directed central extension 22 carrying the ring seal 23.

Cap or cover 9 is shown as carrying externally thereof an indicator structure 30. The external surface 31 of indicator member 30 bears appropriate indicia. Slidable along member 30 and over the indicia surface 31 is an indicator ring 32. A finger member 33 is positioned to engage ring 32 beyond ring 32 from cap 9. A yielding means 34 is active against the external surface of cap 9 and member 33 to urge the same in opposite directions.

Secured to member 33 and extending through member 30 and cap 9 into housing 8 is an indicator-bypass valve rod 40. A sleeve 41 extends inwardly from cap 9 and slidably receives one end ring of an auxiliary filter tube 42 formed of a wire mesh material having openings larger than those of the filter media in element 16. Member 42 surrounds and is secured, at its inner end, to a portion of sleeve 43, the sleeve 43 being received within extension 22 in sealing engagement with seal 23. The offset or shoulder created by a reduced outer diameter of sleeve 43, as indicated at 43a, serves to resist withdrawal of sleeve 42 from its position within extension 22 and seal 23 as shown in FIG. 2.

Figure 2:
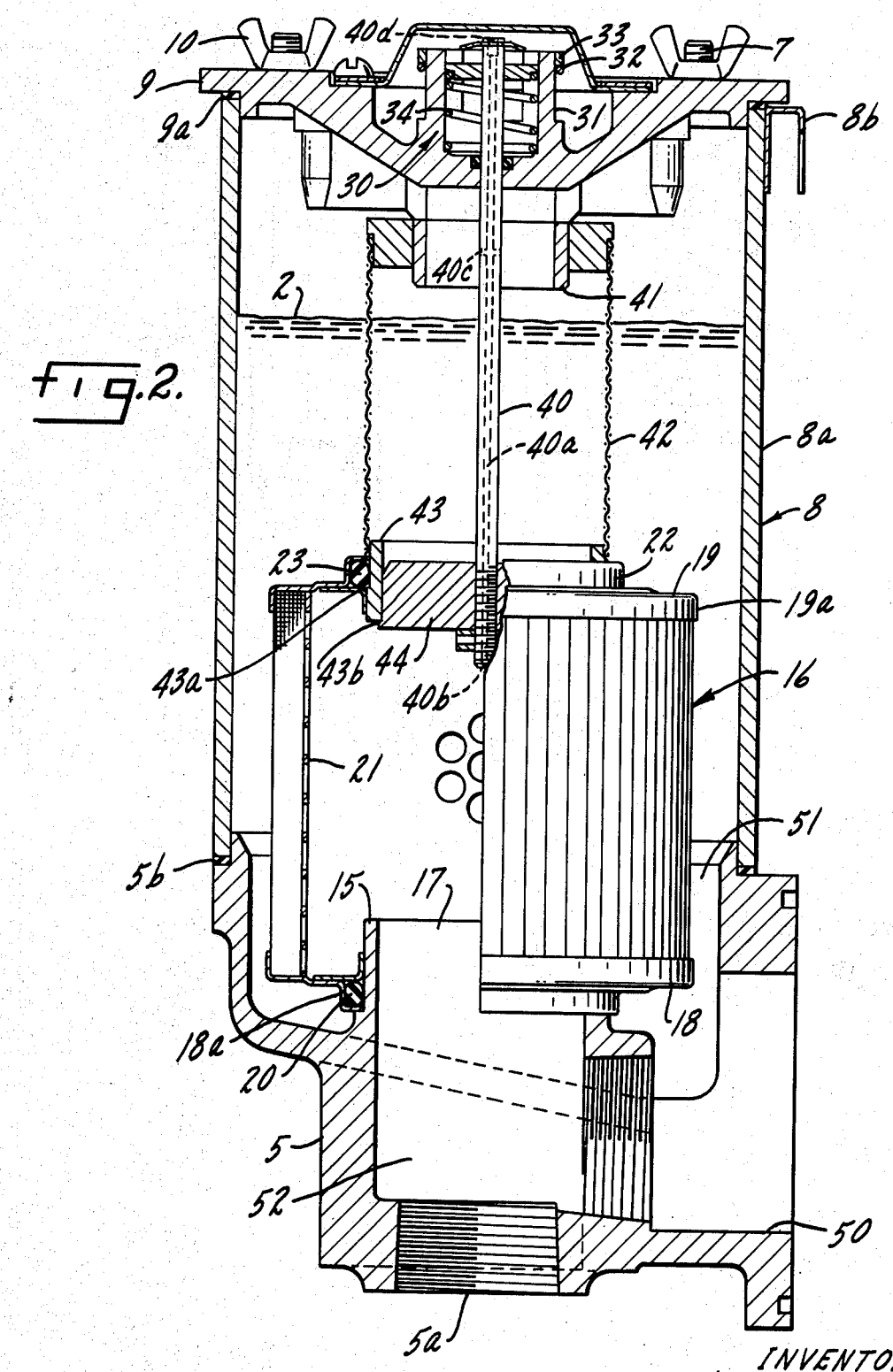
FIG. 2 is a sectional view of the filter assembly of the invention.

The rod 40 extends through filter tube 42 and carries at its distal end, within core 21, a bypass valve member 44 positioned to engage the inner end surface of sleeve 43 and to close the same as indicated at 43b in FIG. 2.

Indicated in dotted lines at 40a is a deaerator or diffuser passage extending through rod 40. Passage 40a is open to the area within element 16 and core 21 thereof as indicated at 40b. Cross openings 40c communicate passage 40a with the area in housing 8 above the maximum liquid level therein. Passage 40a is plugged against communication with atmosphere as indicated at 40d externally of cap 9.

Member 5 has formed therein an opening 50 positioned for axially parallel alignment with opening 4 and providing access to an annular passage 51 around element 16 to communicate the area within reservoir 1 with the area within housing 8 externally of filter element 16. A passage-forming structure 52 is incorporated in member 5 for communication with the filter element outlet 17 defined by sleeve portion 15. Secured to the structure 52 is a conduit 55 extending through the apertures 50, 4 and upwardly through reservoir 1 and cover 3. The conduit 55 communicates with fluid suction pump 56 and the pump-driving means 57 associated therewith. Conduit 59 communicates with pump 56 for delivery of filtered fluid to a point of use.

Return conduit 60 extends downwardly through cover 3 for delivery of fluid requiring filtering to the area within reservoir 1.

Indicated at 61 in FIG. 6 are hollow-diffuser tubes extending through and carried by valve 44. Tubes 61 have their open ends 62 above the maximum level of fluid in housing 8 and their opposite open ends 63 communicating with the area inside element 16.

In FIGS. 3 and 4 a clamp or clip member 70 is slidable on rod 40 and includes finger portions 71 for removably grasping the circumferential flange or wall 19a of cap 19. Threaded on rod 40 above member 70 is an abutment element 72. Sleeve 43 remains for engagement with seal 23 but auxiliary filter 42 has been removed.

In FIG. 5 sleeve 43 and valve 44 are absent, cap 19b is closed, except for the opening through smaller seal 23a, and clamp member 70 is fixed on rod 40, which in turn extends through the smaller seal 23a to communicate passage 40a with the area within element 16. The indicator structure 30—34 being deleted in the absence of valve 44, rod 40 is fixed to cover 9.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention. While the structure of FIGS. 2 and 3 permit the use of standard filter elements, special elements having elongated handles secured thereto may be employed, for example, when one desires to forego the advantage of using a standard element.

The use and operation of the invention are as follows:

The fluid 2, requiring filtering, is delivered to reservoir 1. Said body of fluid will flow through openings 4, 50 and passage 51 into the area within housing 8 and will find its common level in both reservoir 2 and filter housing 8, as illustrated in FIGS. 1 and 2, when pump 56 is not in operation and cover 9 is opened.

The fluid in housing 8 is not under substantial positive pressure and the housing 8 may accordingly be formed of lighter weight, more economical materials. Similarly, the closure 9 for housing 8 may be of light weight, economical material and may be secured in any convenient manner to close the housing 8 against the entry of dust, dirt and the like, the lack of internal positive pressures making the provision of high-pressure sealing elements unnecessary. The seal 9a is effective, as discussed below, to prevent entry of air into housing 8 when pump 56 is operated.

Operation of pump 56 by means 57 draws fluid from the area within housing 8 through the filter element 16 and core 21 thereof, located below the minimum fluid level of reservoir 1 and housing 8, and thence through outlet passages 17 and 52 and through the conduits 55, 59 for delivery to a point of use.

The level in housing 8 will lower substantially when the element 16 is removed for cleaning and pump 56 continues to operate. When, however, cover 9, rod 40 or tubes 61 and element 16 are again in place, pump 56 will draw air from above the fluid in housing 8 and the fluid level will rise to a point substantially above element 16, at which point a full head of fluid will be stabilized, that point being reached before the fluid level reaches openings 40c or the open upper ends 62 of tubes 61.

When element 16 is removed, pump 56 will draw fluid smoothly through opening 4, passages 51, 17 and 52 to conduit 55 without turbulence or substantial air entrapment.

When the filtering media of filter element 16 becomes contaminated or clogged beyond a predetermined level, the pressure differential created, between that within core 21 and the area of housing 8 externally of media 16, will draw valve 44 off its seat and permit the passage of fluid from the area within housing 8 through auxiliary filter tube 42, sleeve 43 and core 21 to outlet passages 17, 52 and conduits 55, 59 in order to maintain operation of the machinery with which conduit 59 is associated. It will be understood that the filter screen of member 42 may conveniently be of larger mesh that that of media 16.

In the form shown in FIG. 2 the offset 43a sufficiently engages seal 23 to overcome the frictional attraction of seal 20 and sleeve 15 whereby removal of cover 9, through engagement of valve 44 with sleeve 42 and the engagement of sleeve offset 43a and seal 23, draws the filter tube 42 and the filter element 16—23 outwardly of housing 8. Since the diffuser rod 40 and its channel 40a or the diffuser tubes 60 accompany cover 9 and element 16, it will be noted that human error in failing to reinsert the deaeration diffuser means, or in leaving the same in place while element 16 is removed, is avoided.

When the operator desires to remove, for cleaning or replacement, the filter element 16—23 from the housing 8, it is equally unnecessary to reach into the fluid in housing 8 or to drain reservoir 1 and housing 8 when the structure of FIG. 3 is employed. In such instance the operator merely disconnects cover 9 and draws cover 9, with rod 40, outwardly of housing 8, the valve 44 engaging sleeve 43 which in turn engages clip 70, the sleeve 43 having a constant outer diameter. The fingers 71 thereupon draw cap 19 and its assembled element 16 outwardly of housing 8, the friction of seal 20 with the external surface of sleeve 15 being substantially the only resistance to such removal.

The length of housing 8 being sufficient to insure against overflow of fluid 2 therewithin, removal of cover 9 and element 16 will involve no spillage.

With the filter element cap 9 and rod 40 out of housing 8, the filter element may be snapped out of engagement with fingers 71 and cleaned or replaced. The element is then reengaged with fingers 71 and reinserted in housing 8, the operator pressing inwardly on finger member 33 to move rod 40 and abutment member 72, as indicated in dotted lines in FIG. 3, to press the filter element back into place on sleeve 15 and into the position shown in FIG. 3. In the form of the assembly illustrated in FIG. 2, the auxiliary filter tube 42 serves to provide sufficient force transmission to force element 16 onto sleeve 15 against the relatively limited frictional engagement of seal 20 with said sleeve 15.

It will be understood that, as shown in FIG. 5, the bypass valve 44 may be dispensed with, under some circumstances, appropriate mechanism (not shown) being often in that case provided for shutdown of the machinery dependent on conduit 59 for filtered fluid when media 16 becomes contaminated. The clip member 70, which removably engages end cap 19b, is fixed to rod 40 and rod 40 is fixed to closure 9, the indicator structure 30—34 being dispensed with, in such case.

Thus is provided a reservoir and filter assembly of minimum cost and yet one by means of which the filter element may be removed and replaced with maximum ease and without opening, entering or disturbing the reservoir itself.

I claim:

1. A reservoir filter assembly including a fluid reservoir, a filter housing mounted externally of and upon said reservoir, said reservoir and housing communicating adjacent their lowermost portions, said housing being of a height greater than the maximum height of fluid in said reservoir, an outlet passage for said housing and a filter element positioned in a lower portion of said housing to filter fluid prior to entry into said passage, said element being positioned entirely beneath the minimum level of fluid in said reservoir and housing, said element having an inner area communicating with said outlet passage and a filter media enclosing said inner area, a suction pump connected to said outlet passage, a cover for said filter housing, a rod carried by said cover and extending into said housing, and means carried by said rod and removably engaging said filter element for removal together from said housing of said cover, rod and filter element.

2. The structure of claim 1 wherein said rod extends from said inner area within said filter element to an area above the maximum level of fluid in said housing and characterized by and including a deaerator passage through said rod to communicate said areas and to communicate said outlet passage and pump with said area above said fluid level.

3. The structure of claim 1 wherein said means includes an opening in said filter element, a sleeve carried by said cover and rod for insertion in said opening, a seal carried by said element in said opening, said sleeve having a first diameter insertable through said seal and a second diameter less than said first diameter, said seal engaging said second diameter in sealing relationship, said diameters creating an annular shoulder engageable with said seal in response to retrograde movement of said sleeve in said opening, whereby said cover, sleeve and element are removable together from said housing.

4. The structure of claim 1 wherein said means includes a clip member carried by said rod and removably engaging said filter element.

5. The structure of claim 1 wherein said rod is slidable in said cover and said means includes a bypass valve member carried by said rod, a sleeve carried by said rod and valve member, a clip member slidable on said rod beyond said sleeve from said valve member, and an abutment on said rod beyond said clip member from said sleeve, said sleeve and valve member being insertable into said filter element, said clip member engaging said filter element.

6. The structure of claim 5, characterized by and including an indicator member carried externally on said cover, said rod having a portion extending through said cover to actuate said indicator member, yielding means carried externally of said cover by said indicator member and urging said rod outwardly of said cover and said valve member toward said sleeve, said rod portion being movable against the action of said yielding means to urge said abutment toward said clip member and filter element to move said filter element toward said outlet passage.

7. In a filter reservoir assembly, a reservoir, a filter housing, said reservoir and housing communicating adjacent their lower portions, an outlet in a lower portion of said housing, a suction pump connected to said outlet, a filter element between said outlet and the fluid in said housing, said filter element having a core area communicating with said outlet for flow of fluid from said housing through said filter element and said core area to said outlet, and a diffuser member communicating said core area and outlet with the area above the level of liquid within said housing whereby in response to initial action of said pump, air in the area above said liquid level is drawn into and through said core area to said pump, the pressure above said liquid level is reduced and said liquid level is raised.